United States Patent Office 2,737,507
Patented Mar. 6, 1956

2,737,507

SELENOL MODIFICATION OF SYNTHETIC RUBBERLIKE MATERIALS

Bailey Bennett, Columbus, Ohio, assignor, by mesne assignments, to the Battelle Development Corporation, Columbus, Ohio, a corporation of Delaware No Drawing. Application March 16, 1953, Serial No. 342,715

15 Claims. (Cl. 260—82.3)

This invention relates to the polymerization of butadiene hydrocarbons and mixtures of butadiene hydrocarbons with copolymerizable vinyl compounds in aqueous emulsion in the presence of selenol compounds.

In the past it has been the practice to use mercaptans as modifiers in elastomer formation. This process is illustrated, for example, by the disclosure in U. S. Patent No. 2,281,613 to Wollthan et al. However, such prior art processes using mercaptans have certain well-known disadvantages, as enumerated below, which the present invention is intended to overcome.

A disadvantage of the mercaptans is that the mercaptans were developed for use in emulsion polymerization systems at 50° C. If it is desired to carry out emulsion polymerizations at high temperatures, such as up to 150° C., the mercaptans are not well adapted for use as modifiers. The activity of mercaptans is relatively great at high polymerization temperatures, with the mercaptan being consumed too rapidly to satisfactorily modify and regulate the elastomer polymerization.

Another disadvantage of the mercaptans is a lack of control over the formation rate of the elastomers at high polymerization temperatures.

Still another disadvantage is that an oil-resistant elastomer polymerized in the presence of a mercaptan at low temperature when compounded into a rubberlike material would not exhibit the optimum balance of oil-resistance and low-temperature properties. For example, it is well known in the art that if the rubberlike material should have a high oil resistance, the low-temperature properties would be poor; on the other hand, if the low-temperature properties were good, the oil resistance of the compounded rubber would be poor.

Still another disadvantage is that the mercaptans are not satisfactory for use in continuous polymerization processes carried out at high temperatures. A satisfactory continuous polymerization process requires rapid conversion to the elastomer, with proper modification thereof, and a modifier that will remain active for the duration of the continuous polymerization process. Mercaptans are too reactive at the higher temperature and overmodify the polymer. Further, mercaptans are too rapidly consumed at high temperatures and thus the reaction will die out if the amount of mercaptan used is lessened so as to avoid overmodification of the polymer.

It is an object of the invention to provide a new and useful method of modifying or regulating synthetic elastomers during their formation in emulsion systems.

Another object of the invention is to provide a method of modifying or regulating formation of synthetic elastomers at temperatures up to 150° C.

Another object of the invention is to provide a method of control over the formation of synthetic elastomers at high polymerization temperatures.

Another object of the invention is to provide a synthetic oil-resistant elastomer that, when compounded into a rubberlike material, will exhibit the optimum balance of oil-resistance and low-temperature properties.

Still another object of the invention is to provide a method of continuous high-temperature polymerization. Simultaneous modifier or regulator action, and promoter action, are possible at the high temperature required for the successful operation of a continuous polymerization process.

The present invention relates to the process, and the product produced thereby, of polymerizing a material selected from the group consisting of 1,3-butadiene hydrocarbons and mixtures of 1,3-butadiene hydrocarbons with copolymerizable compounds having a single C=C double linkage in aqueous emulsion in the presence of selenols having at least four carbon atoms in aliphatic linkage.

The selenols are analagous in chemical composition to the mercaptans in that selenium atoms replace the sulfur atoms of mercaptans. Typical selenols are butyl ($C_4SeH$), octyl ($C_8SeH$), dodecyl ($C_{12}SeH$), and hexadecyl ($C_{16}SeH$)

The selenols behave in a manner similar to that of mercaptans in emulsion polymerization, but with reduced activity at any given polymerization temperature.

The following examples are submitted for the purpose of illustrating the present invention and are not to be construed as limiting or restricting it thereto. In all examples the proportions are given in parts by weight.

EXAMPLE I

A copolymer of butadiene-acrylonitrile was obtained at a polymerization temperature of 150° C. with a polymerization time of .75 hour by the addition to 180 parts of water of 10 parts of soap (P&G SF Flakes manufactured by Procter & Gamble, Cincinnati, Ohio), 0.6 part of potassium chloride and .01 part of potassium persulfate; to this aqueous phase were added 35 parts acrylonitrile, 4 parts of n-octyl selenol and 65 parts of butadiene.

EXAMPLE II

A copolymer of butadiene-acrylonitrile was obtained in the same manner as Example I, except that the modifier used was n-dodecyl selenol, 4 parts.

EXAMPLE III

A copolymer of butadiene-styrene was obtained at a polymerization temperature of 150° C. with a polymerization time of .75 hour by the addition to 180 parts of water of 10 parts of soap (P&G SF Flakes manufactured by Procter and Gamble, Cincinnati, Ohio), 0.6 part of potassium chloride and .01 part of potassium persulfate; to this aqueous phase were added 25 parts styrene, 4 parts of n-octyl selenol and 75 parts of butadiene.

EXAMPLE IV

A copolymer of butadiene-styrene was obtained in the same manner as Example III, except that the modifier used was n-dodecyl selenol, 4 parts.

EXAMPLE V

A copolymer of butadiene-acrylonitrile was obtained at a polymerization temperature of 120° C. with a polymerization time of 2 hours by the addition to 180 parts of water of 3.0 parts of soap (P&G SF Flakes manufactured by Procter and Gamble, Cincinnati, Ohio), 0.6 part KCl and .1 part urea peroxide; to this aqueous phase were added 35 parts acrylonitrile, 4 parts of n-dodecyl selenol and 65 parts butadiene.

EXAMPLE VI

A copolymer of butadiene-acrylonitrile was obtained at 90° C. with a polymerization time of 4 hours by the addition to 180 parts of water of 1.5 parts of soap (Dresinate 731 manufactured by Hercules Powder Company, Wilmington, Delaware), 0.6 part of potassium chloride, .004 part of potassium persulfate; to this aqueous phase were added 35 parts acrylonitrile, 2 parts of n-octyl selenol and 65 parts of butadiene.

EXAMPLE VII

Copolymers obtained by Example I were compounded into a rubberlike material in a standard test recipe consisting of 100 parts of copolymer, 40 parts of carbon black (Statex B, distributed by the Binney and Smith Company, New York, New York), 5 parts zinc oxide, 1.25 parts sulfur, and 1.75 parts of rubber accelerator (Altax, manufactured by the R. T. Vanderbilt Company, New York, New York).

The use of selenols is particularly adapted to polymerization at relatively high temperatures where the usual modifying agents, the mercaptans, are consumed very rapidly. The lower order of activity of certain of the selenols makes them peculiarly adapted for use at high temperatures.

Another advantage is that the reduced activity at higher temperatures of the selenols enables elastomers of superior properties to be obtained as, for example, the favorable balance of oil-resistance and low-temperature properties of a butadiene-acrylonitrile copolymer.

Further, as the selenol content increases, a desirable combined modifier or regulator and promoter activity result. Table I illustrates for a butadiene-acrylonitrile copolymer the increase in the conversion of monomers to copolymers, and a decrease in gel content as the selenol present is increased with time and temperature remaining constant. The data set forth in Table I were obtained with elastomers prepared as per Example I except that the selenol was varied from 0 to 4 parts, by weight.

*Table I*

| Parts by Weight of n-octyl selenol | Conversion, Percent | Gel Content, Percent |
| --- | --- | --- |
| 0.0 | 24.6 | 79.6 |
| 1.0 | 29.3 | 64.1 |
| 2.0 | 41.1 | 52.3 |
| 4.0 | 45.0 | 37.0 |

These data indicate the desirability of using selenols for high-temperature polymerization because of the simultaneous modifier or regulator and promoter activity which may be obtained by the use thereof.

High-temperature emulsion polymerization is desirable and advantageous in certain instances as, for example, in promoting the reaction rates and enhancing certain properties of the elastomer so prepared. Of particular importance are the properties of oil-resistant rubber-like materials relating to the balance of oil-resistance and low-temperature properties. By carrying out emulsion polymerization at a high temperature in the presence of the selenols, an oil-resistant elastomer may be obtained which, when compounded, will show very favorable oil-resistance properties, and, at the same time, have extremely good low-temperature properties. Under the prior art utilizing mercaptans, it is necessary to sacrifice one property to obtain the other. By high-temperature polymerization in the presence of selenols, both the oil-resistance properties and the low-temperature properties of the elastomer will be extremely favorable with little or no sacrifice of one property to obtain the other.

In the experimental production of butadiene-acrylonitrile elastomers, polymerized in the presence of a selenol, it is evident that the favorable balance of oil-resistance and low-temperature properties of such elastomers is promoted by the increase in polymerization temperature. The synthetic elastomers prepared by the new process have been shown to be superior in the balance of oil-resistance and low-temperature properties to that of similar elastomers which have been prepared with mercaptans.

This favorable balance of properties in the butadiene-acrylonitrile type elastomers is possible due solely to the use of selenols in the elastomer modification.

To illustrate this new, novel, and surprising balance of oil-resistance and low-temperature properties, comparative tests were made on elastomers, as prepared in Example I, and an elastomer modified by an n-octyl mercaptan compounded in exactly the same manner as the elastomers in Example I except that the time was 0.5 hours. For test purposes, both of the elastomers were compounded into a rubber-like material, as per Example VII.

(1) Oil-resistance properties (expressed in terms of per cent swell on 24-hour immersion in reference Fuel No. 2).

Per cent
Selenol modified elastomer _____ 70.1
Mercaptan modified elastomer _____ 84.5

(2) TR–70 low-temperature properties (expressed as per cent retraction at a particular temperature, that is, the temperature at which 70 per cent retraction is obtained). The TR–70 indicates serviceability of an elastomer after long exposure to low temperature.

Selenol modified elastomer _____ Minus 32° C.
Mercaptan modified elastomer _____ 0° C.

(3) TR–10 low-temperature properties (expressed as per cent retraction at a particular temperature, that is, the temperature at which 10 per cent retraction is obtained). The TR–10 indicates serviceability of an elastomer prior to storage at low temperature.

Selenol modified elastomer _____ Minus 50° C.
Mercaptan modified elastomer _____ Minus 35° C.

The nitrile content of the above-compared samples was 20.7 per cent for the selenol modified elastomer, and 19.4 per cent for the mercaptan modified elastomer.

Thus, it may readily be seen that the selenol polymerized elastomer when compounded into a rubberlike material has superior oil-resistant properties and superior low-temperature properties.

A further advantage is that the selenols possess combined promoter and regulator or modifier activity, a combination of properties which make them available for the continuous, rapid production of synthetic elastomers at high temperature in emulsion systems. Both simultaneous modifier and promoter action of the selenols may be obtained through the use of selenols in emulsion polymerizations at 150° C. These properties would enable this polymerization system to be used in a continuous high-temperature polymerization process, such as might be carried out in a tube or pipe through which emulsions flow continuously. In such a process, rapid conversion coupled with good modification would be desirable. The materials necessary for obtaining such activity would, of necessity, have to possess both combined promoter and modifier activity.

While the particular embodiments of the invention have been shown and described, it will be obvious to those skilled in the art that various changes and modifications may be made without departing from the invention in its broader aspects, and, therefore, the appendant claims are intended to cover all such changes and modifications as fall within the true spirit and scope of the invention. Furthermore, it is understood that the invention is not to be limited to the specific form, or compositions, or temperatures herein described and shown.

What is claimed is:

1. The process which comprises polymerizing a material selected from the group consisting of 1,3-butadiene hydrocarbons and mixtures of 1,3-butadiene hydrocarbons with copolymerizable compounds having a single C=C double linkage in aqueous emulsion in the presence of selenols having at least four carbon atoms in aliphatic linkage.

2. The process according to claim 1 wherein the selenol is an n-octyl selenol.

3. The process according to claim 1 wherein the selenol is an n-dodecyl selenol.

4. The process according to claim 1 wherein the copolymerizable compound is acrylonitrile.

5. The process according to claim 4 wherein the selenol is an n-octyl selenol.

6. The process according to claim 4 wherein the selenol is an n-dodecyl selenol.

7. The process which comprises polymerizing a mixture of 1,3-butadiene hydrocarbons with styrene in aqueous emulsion in the presence of selenols having at least four carbon atoms in aliphatic linkage.

8. The process according to claim 7 wherein the selenol is n-octyl selenol.

9. The process according to claim 7 wherein the selenol is n-dodecyl selenol.

10. In the process of polymerizing a 1,3-butadiene hydrocarbon in emulsion in water with an emulsifying agent, a polymerizing initiator, a comonomer and a selenol, the step of conducting the polymerization at a temperature of at least 90° C.

11. The process of polymerizing a 1,3-butadiene hydrocarbon in emulsion in water with an emulsifying agent, a polymerizing initiator and acrylonitrile in the presence of a selenol.

12. The process of polymerizing a 1,3-butadiene hydrocarbon in emulsion in water with an emulsifying agent, a polymerizing initiator and styrene in the presence of a selenol.

13. A composition of matter, a copolymer comprising 1,3-butadiene hydrocarbons and copolymerizable compounds having a single C=C linkage and containing selenium as an integral part thereof.

14. A composition of matter according to claim 13 wherein the copolymerizable compound is acrylonitrile.

15. A composition of matter according to claim 13 wherein the copolymerizable compound is styrene.

References Cited in the file of this patent

UNITED STATES PATENTS 2,281,613     Wollthan _____ May 5, 1942